United States Patent [19]

Fragola

[11] Patent Number: 4,655,938
[45] Date of Patent: Apr. 7, 1987

[54] PROCESS AND CONTRIVANCE FOR THE REGENERATION OF LUBRICATING OILS

[75] Inventor: Guglielmo Fragola, Turin, Italy

[73] Assignees: RE.MAC.UT., S.p.A.; Giorgio Costa, both of Turin, Italy; part interest to each

[21] Appl. No.: 705,994

[22] Filed: Feb. 27, 1985

Related U.S. Application Data

[63] Continuation-in-part of Ser. No. 384,429, Jun. 2, 1982, abandoned.

[30] Foreign Application Priority Data

Jun. 3, 1981 [IT] Italy .................. 67760 A/81

[51] Int. Cl.[4] .............................................. B01D 29/38
[52] U.S. Cl. ............................ 210/798; 210/108; 210/168; 210/411; 210/416.5; 210/421; 210/799; 210/805
[58] Field of Search .............. 210/791, 797, 798, 106, 210/107, 108, 407, 409, 411, 416.5, 422, 423, 424, 425, 427, 787, 799, 805, 354, 412, 421, 512.1–512.3

[56] References Cited

U.S. PATENT DOCUMENTS

| | | | |
|---|---|---|---|
| 3,081,876 | 3/1963 | Bizard | 210/108 |
| 3,275,148 | 9/1966 | Vicino | 210/168 |
| 3,645,400 | 2/1972 | Floyd | 210/108 |
| 3,879,286 | 4/1975 | Berriman | 210/409 |
| 4,217,220 | 8/1980 | Egli et al. | 210/791 |
| 4,315,820 | 2/1982 | Mann et al. | 210/411 |
| 4,332,541 | 6/1982 | Anders | 210/791 |
| 4,462,902 | 7/1984 | Silhouette | 210/409 |

Primary Examiner—Ivars Cintins
Assistant Examiner—Wanda L. Millard
Attorney, Agent, or Firm—Frost & Jacobs

[57] ABSTRACT

A process and apparatus for the regeneration in operation of lubricating oils having a first stage in which a flow of oil passes through a filtering surface, then a second and third stage in which a portion of the flow of oil is intercepted and sent countercurrently under a pre-established overpressure to the first stage flow and finally, a fourth stage for varying the position of delivery countercurrent to the filtering surface.

5 Claims, 11 Drawing Figures

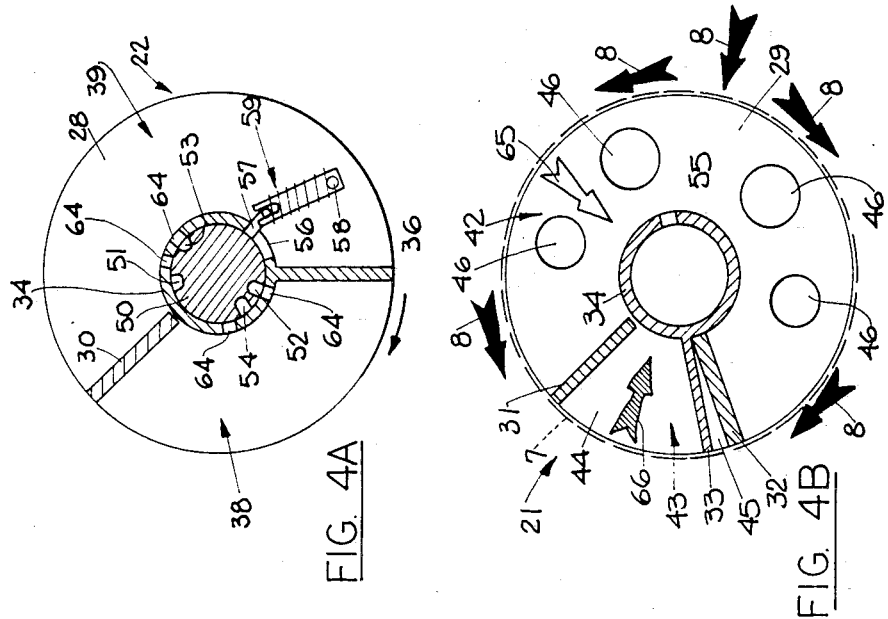
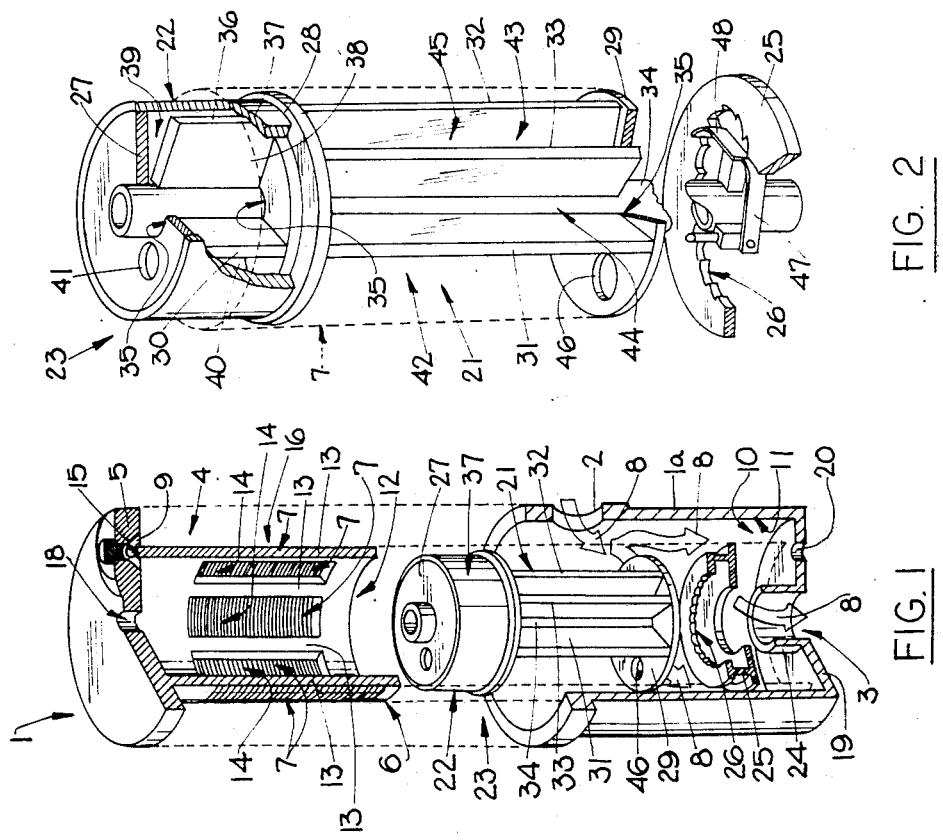

PROCESS AND CONTRIVANCE FOR THE REGENERATION OF LUBRICATING OILS

This application is a continuation-in-part of co-pending U.S. application Ser. No. 384,429 filed on June 2, 1982 by Guglielmo Fragola, now abandoned.

The present invention relates to a process for the regeneration during operation of lubricating oils, in particular for the treatment of lubricating oils of internal combustion engines. It further concerns an apparatus for carrying out such a process.

It is know that lubricating oils are subject to chemical aging due to operational stress, which alters decidedly their chemical and physical properties and especially the viscosity, so that they rapidly become unfit for their lubricating role. Such aging is particularly quick and ascertainable in lubricating oils meant for internal combustion engines, due to the heavy duty conditions during operation (high temperatures, presence of metal surfaces with catalytic influence on aging processes, the bearings) which entail in the oil first a cracking phenomenon, then oxidation and polymerization, which causes the formation of microscopic solid or semi-solid particles consisting of carbon and olefinic polymers. Such particles in a first time remain in suspension within the oil but when they reach a percentage of up to 4% or 5% of the total weight of the oils and particles they tend to agglomerate, in spite of the presence of special additives, forming a sludge of major dimensions which sharply lowers the lubricating power of the oil, because it promotes the braking of the lubricating film and forms a deposit inside the lubricating circuit with possible occlusion. To avoid such drawbacks, one affects a continuous treatment in operation of the lubricant, which is strained or centrifuged so as to retain the formed sludge and to impede the largest particles to be reintroduced into the lubricating circuit. In spite of this treatment, however, the quality and quantity of lubricating oil decreases progressively because the formation of the sludge is not stopped, and the oil, after a certain lapse of time in operation must be replaced.

SUMMARY OF THE INVENTION

The object of the present invention is to realize a process for the regeneration during operation of lubricating oils, with particular reference to lubricating oils for internal combustion engines, which process be able to prevent the formation of sludge and to preserve in the treated oil good lubricating features and an operational duration longer than that obtainable with the known filtering processes. This object is reached by the present invention, which relates to a process for treating a lubricating oil in order to eliminate the sludge particles formed because of oil aging the process being carried out continuously on flowing lubricating oil during operation of an internal combustion engine, comprising:

a first step, in which flowing oil from the engine is passed through a filtering surface having meshes of relatively small size;

a second step, in which said flowing oil is subdivided into a first and a second portions having pre-established rates of flow;

a third step, in which said first portion is backflushed through a section of said filtering surface, in counterflow to the direction of flow in said first step and at a pre-established pressure, the second of said two portions being passed back into said internal combustion engine; and a fourth step, in which a plurality of adjacent sections forming said filtering surface are successively back flushed by said first portion; said second and third step being performed continuously and simultaneously and the mesh size of the filtering surface, the pressure and the rate of flow of said first portion being such that during said first and third steps the sludge particles are subjected to a shear rate capable of impeding the formation of deposits on the filtering surface and breaking and mixing continuously said sludge particles.

BRIEF DESCRIPTION OF THE DRAWINGS

The present invention will be now decribed with reference to the accompanying drawings, in which:

FIG. 1 shows a perspective view of an apparatus according to the present invention and adapted to realize a process for the regeneration of lubricant oils during operation of the same.

FIG. 2 is an enlarged perspective view of the pumping device and trunion fixture of the apparatus shown in FIG. 1.

Figure 3:
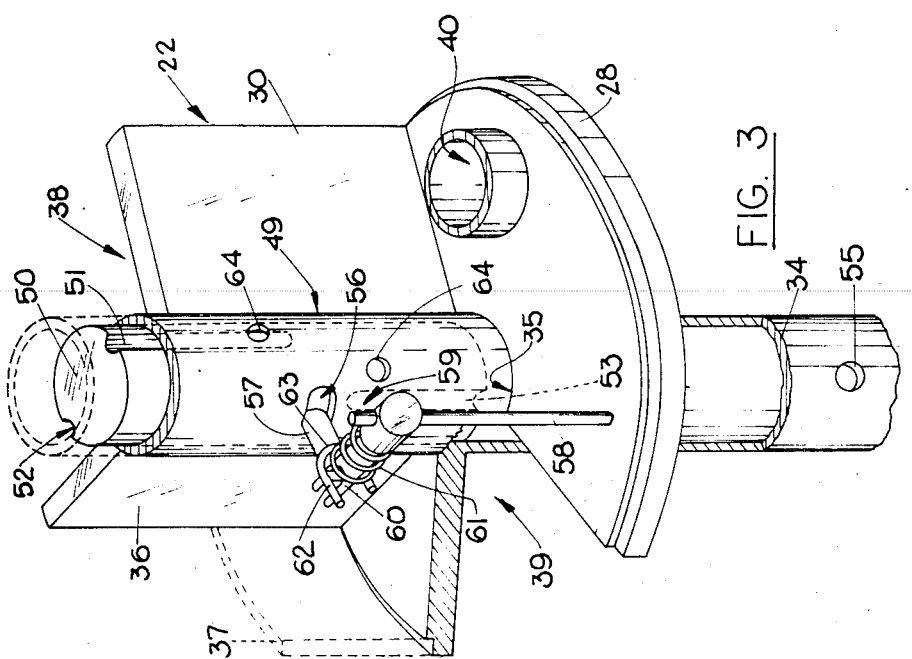
FIG. 3 is an enlarged perspective view of the trunion fixture of the apparatus shown in FIGS. 1 and 2.

FIGS. from 4a to 4d shows schematically the operation of the apparatus of FIGS. 1, 2 and 3.

Figure 5:
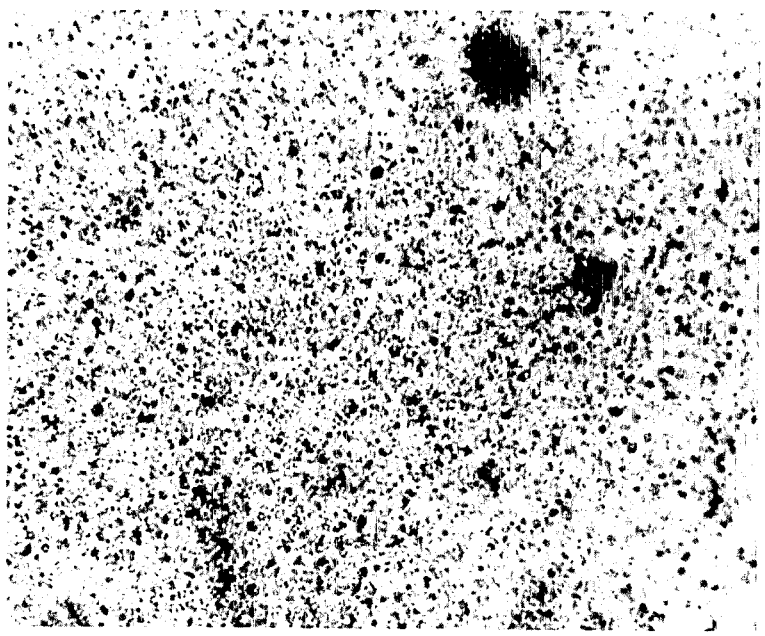

FIG. 5 shows a microphotograph of a lubricating oil treated by conventional method.

Figure 6:
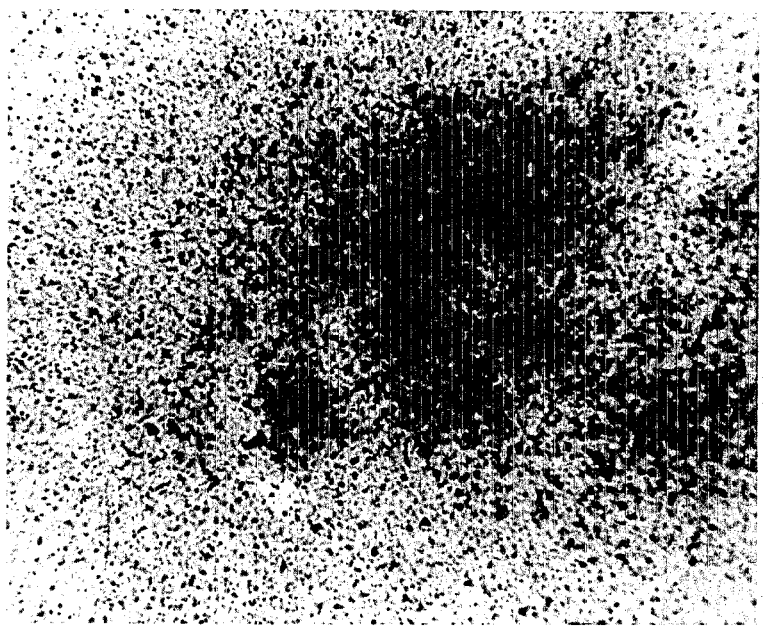

FIG. 6 shows a microphotograph of a lubricanting oil of the same type treated according to the process of the present invention.

Figure 7:
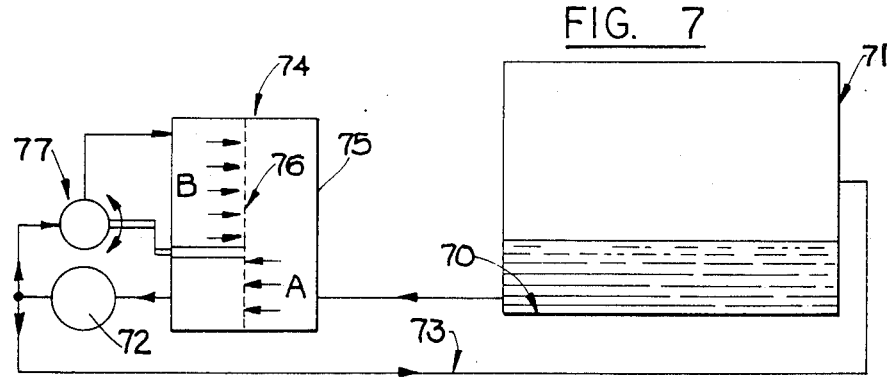

FIG. 7 shows schematically the process according to invention, and

Figure 8:
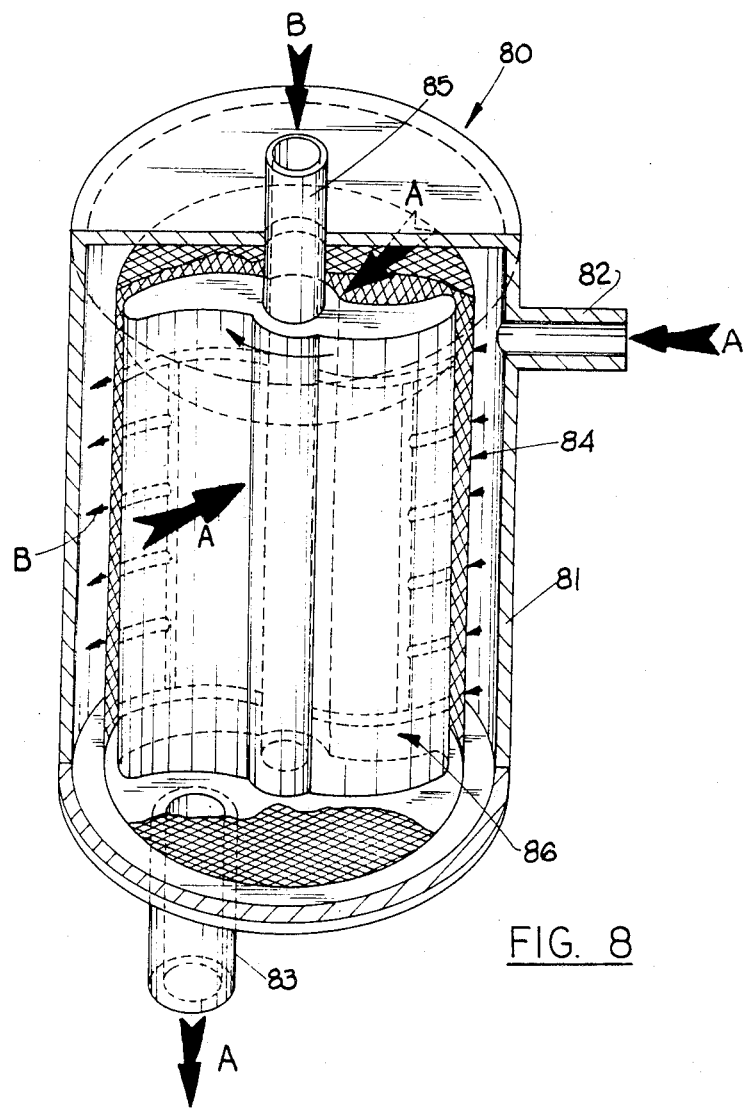

FIG. 8 shows a perspective view of another apparatus able to realize the process according to the invention.

DETAILED DESCRIPTION OF THE INVENTION

With reference to FIG. 7, a lubricating oil contained inside an engine pan 70 of an endothermic engine 71 of any known type is recirculated by means of a pump 72 along a lubricating circuit 73 of engine 71, from engine pan 70 to engine 71 and back to pan 70. Owing to the operational conditions of engine 71, this oil undergoes a chemical aging, which implies the polymerization of a part of the oil with formation of sludge particles of small dimensions. These particles, as it is known, agglomerate progressively into greater sludge particles; these greater particles have to be removed, normally by filtration, from the oil in order to avoid circuit 73 from becoming obstructed.

The Applicants have surprisingly found that such agglomeration of the small sludge particles into greater particles can be avoided by mechanically treating the oil during the recirculation of the same in the lubricating circuit. It has been found that this treating can be accomplished by replacing the common oil filter, normally disposed along the lubricating circuit upstream from (or downstream from) the recirculation pump (with respect to the direction of flow), with a homogenizing device 74, which may consist in any known self-cleaning filter of the back flushing type, provided that this backflushing filter is operated under very particular and critical conditions of rate of flow and of pressure, which conditions, as found by the Applicant, can be obtained, for some known filters, by means of a suitable sizing of the different components of the filter itself and, for other filters, by suitably regulating the back-flushing flow.

On the grounds of the above the Applicants have therefore realized a new process for treating in operation lubricating oils in place of filtration, which will be now described with reference FIG. 7. Device 74 comprises a shell 75, a filtering surface 76, and means 77 for delivering through filtering surface 76, in counter-current to the main flow along circuit 73, a backflushing flow. According to the process of the invention a main flow A of oil, which flows along circuit 73 is fed into shell 75 and flows therein through filtering surface 76; immediately downstream from filtering surface 76 the flow of oil may be pressurized by pump 72 and subdivided into a first flow, which is delivered towards engine 71, and into a backflushing flow B, which is fed back, by means 77, to shell 75 in countercurrent to flow A, in order to backflush a portion of surface 76. Means 77 automatically provides delivery of flow B against surface 76 and to continuously vary the portion of surface 76, which is backflushed, so that the whole filtering surface is crossed, step by step, by the backflushing flow. The backflushed flow B is remixed with main flow A inside shell 75 and therefore the total balance of inflow through circuit 73 is constant.

From the above it is clear that in the process of the invention the same steps of a known backflushing filtering process may apparently be found, i.e. a first step in which flowing oil from the engine is passed through a filtering surface; a second step in which the flowing oil is subdivided into two portions having preestablished rates of flow; a third step, in which one of said portion is backflushed through a section of said filtering surface, in counterflow to the direction of flow in said first step, the second of said two portions being passed back into said engine; and a fourth step in which a plurality of adjacent sections forming said filtering surface are successively backflushed by said first portion of flow. Unlike known backflushing filtering processes, in the process according to the present invention the mesh size of the filtering surface and the pressure and rate of flow of the first portion of flow (backflushing portion B) are such that during said first and third steps the sludge particles present in the oil and due to its aging are subjected, according to what surprisingly found by the Applicants, to a shear rate capable of impeding the formation of deposits on the filtering surface and breaking and mixing continuously said sludge particles.

In the case of lubricating oils for endothermic engines the Applicants have found that, in order to realize the process of the invention, the mesh size of the filtering surface has to be preferably comprised between 3 and 50 microns, the rate of flow of the backflushing flow B has to be absolutely not lower than to 10% of the rate of flow of the main flow A, and the delivery pressure of the backflushing flow B has to be at least 2 kg/cm$^2$ higher than the inlet pressure of the main flow A upstream from filtering surface 76.

The above values are absolutely critical, because if they are not met device 74 works as a common self-cleaning filter, with formation of sludge deposits on surface 76, which deposits are exspelled by the backflushing flow on the bottom of shell 75.

On the contrary, when the above critical parameters are met, any type of backflushing filter operated according to the process of the invention develops a completely new and surprising behaviour consisting in the fact that filtration no more takes place through the filtering surface of the filter, while on the contrary the fluid fed to the filter is subjected to such a high shear rate that the sludge particles are broken into smaller particles, the dimensions of which are so small to be smaller than the dimensions of the meshes of the filtering surface, so that the sludge is not strained by the filter, but passes through the filtering surface without being retained. The Applicants think that this high shear rate is due to the hydrodynamic action of the eddie currents, which are formed in the fluid by the collision between the main flow of fluid, which passes through the filtering surface, and the simultaneous counterflow of fluid, which is backflushed through the filtering surface in the opposite direction, in the case the backflushing pressure and rate of flow are sufficiently high. Obviously, in order to ensure operability of the process, the backflushing flow has to interest a limited extent only of the filtering surface because, in the opposite case, the main flow cannot cross the filter.

The Applicants have also found that for developing such a new behaviour in a backflushing filter the density and viscosity of the treated fluid have to be relatively high, so that oils only, and particularly lubricating oils, can be successfully treated with the process of the invention; also the dimensions and shape of the meshes of the filtering surface are important for obtaining the best results, because above certain dimensional values of meshes the process of the invention can be obtained by adopting very high backflushing pressures only, or even cannot be obtained at all.

By the way, the absolute value of the backflushing pressure is not critical "per se", but in relation to the inlet pressure of the oil only. The true critical parameter for obtaining the process of the invention is therefore the value of the backflushing (or countercurrent) "overpressure", i.e. of the difference of pressure between the delivery pressure of the countercurrent (or backflushing) flow and the inlet pressure of the oil in the filter, e.g. just the value herein above indicated as critical for the process of the invention.

The Applicants have surprisingly found also that a lubricating oil treated with the process of the invention, i.e. by means of a backflushing filter operated in such a manner to develope the above described new behaviour of operation improves its lubricating properties instead of making worse them, as a skilled person may think. In fact the sludge particles, which remain instable suspension inside the oil, reach such a high concentration (about 16% by weight) that the oil develops thixotropic characteristics, which maintain the dynamic viscosity of the oil substantially coustant also if its kinematic viscosity decreases with the increase of the operation time of the oil. Moreover the Applicants have noted that, when an oil so treated is used in order to lubricate an endothermic engine, the presence of such a large number of small sludge particles suspended in the oil and flowing together with it allows a thin layer of carbon to be built on the entire lubricating circuit. This is due probably to a cracking phenomenon that detaches from the small sludge particles smaller carbon particles, which are adsorbed by the phorous of the metallic surfaces of the engine. The carbon layer completely covers after a short time the inner surface of the cylinder liners and of the crank shaft bearings, so that when all the metallic surfaces reached by the oil are covered by carbon the aging of the oil pratically ceased, any further catalytic influence of the metallic surfaces being avoided by the carbon layer. It has been noted also that this carbon layer is particularly useful in order to prolong the life of the engine, this layer acting as a protective surface against corrosion and friction seizure.

With reference to the microphotographs of FIGS. 5 and 6 the above described new and surprising behaviour of the oil treated with the process of the invention is proved by the remarkable modifications in its structure that the oil undergoes owing to the process of the invention when compared to a filtered or centrifuged oil, which has worked for the same time.

The microphotograph 5 shows a used oil treated conventionally. Note the abundant presence of sludge and of solid particles having considerable dimensions suspended in the oil, as well as a remarkable trend of the sludge toward aglommeration. FIG. 6 shows a microphotograph of oil treated according to the present invention, in which the time of treatment was identical to the time of treatment for the FIG. 5 microphotograph. FIG. 6 shows an absence of sludge and a larger presence of solid particles, which are very small and show no tendency to aglommerate.

As previously described any type of backflushing filter, known or of new conception, can be employed in order to obtain the process of the invention, provided that it is operated with a backflushing overpressure of about 2 kg/cm$^2$ and with a backflushing rate of flow not lower than the 10% of the rate of flow of the total oil treated by the filter (i.e. of the oil flowing in circuit 73).

Nevertheless it has been found that some types of backflushing filters are particularly suited for operating under the conditions of the process of the invention. Two embodiments of these particularly suited filters will be now described with reference to FIGS. 1 to 4 and 8. The two embodiments are completely different in structure, so that it is put in evidence that the steps of the process of the invention are completely indipendent of a particular structure.

In FIG. 8 a hydrodynamic homogenizing device 80, structured according to the process of the invention is shown. Device 80 comprises a cylindrical shell 81 having an inlet 82 and an outlet 83, which may be arranged along circuit 73 as shown for device 74, and an inner filtering cartridge 84, which defines the filtering surface 76. Outlet 83 may be connected with recirculating pump 72 upstream from pump 72 itself and a further inlet 85, coaxial with cartridge 84, may be connected with pump 72, downstream from it, in order to receive a part B of the pressurized oil. Inside cartridge 84 a shaped propeller 86 is rotatably housed; propeller 86 is provided with a double plurality of opposite tangential nozzles 87 connected to inlet 85 so that the pressurized oil B may be ejected from nozzles 87 against cartridge 84, in countercurrent to flow A of oil moved through cartridge 84 from inlet 82 to outlet 83, by suction of pump 72; in this manner flow B of pressurized oil is backflushed through limited portions of the filtering surface in countercurrent to the main flow of oil, and simultaneously the dynamic reaction, which is due to tangential jets 87 compels propeller 86 to rotate, so that the whole filtering surface can be successively backflushed. It is therefore sufficient to operate pump 72 in order to pressurize the oil at least at 2 kg/cm$^2$ over the environment pressure and in order to feed to inlet 85 a flow B which is at least equal to the 10% of the flow A of oil through circuit 73 for obtaining the process of the invention.

With reference to FIGS. 1, 2 and 3 a different embodiment 1 of the homogenizer 74 is shown. Device 1 is based on the structure of the known self-cleaning filter described in the U.S. Pat. No. 3,081,876 (Bizard) the disclosure of which is incorporated herewith by reference. Neverthless the structure of device 1 slightly differs from that of the Bizard's filter, as hereinbelow described, in order to ensure a substantially continuous backflushing flow, while, on the contrary Bizard realizes a discontinuous flow only.

Device 1 comprises a shell 1a having an inlet 2 and an outlet 3 connectable in any conventional manner with the lubricating circuit 73 of the internal combustion engine 71, and a filtering cartridge 4 in coaxial alignment with shell 1a and comprising a lid 5 for sealing shell 1a and a hollow body 6, which is essentially cylindrical, wherein the cylindrical surface is the filtering surface.

Inlet 2 has to be connected with pump 72 downstream from it, so that a continuous lubricant oil flow 8 from the sump is sent under pressure through hollow body 6 to outlet 3 and back into the lubricating circuit where it returns to the sump. Lid 5 is fixed in an appropriate manner (e.g. screwed) to shell 1a, which has the shape of a cylindrical pail and can be advantageous made of plastic or metal. The lid 5 is further equipped with emergency by-pass 9 in order to enable the passing of oil from an annular chamber 10 between a side wall 11 of the shell 1a and the filtering surface 7 to a cylindrical chamber 12 inside hollow body 6. The latter shows some ribbings 13 between which are openings 14 closed by filtering surface 7 through which oil can flow from chamber 10 to chamber 12 and from chamber 12 to outlet 3 in coaxial position with cartridge 4. By-pass 9 is usually closed by an occlusion ball 15 movable through elastic (resilient) means so that oil primarily passes through openings 14. Should surface 7 be occluded by outer contaminants and unable to permit oil to pass through openings 14, pressure in chamber 10 is increased and opens by-pass 9, thus enabling a continuous flow of oil 8. Surface 7 is formed, according to the preferred embodiment of the invention by stainless steel wire having an extremely reduced diameter between 1/10 of a millimeter and 1/100 of a millimeter, spiral wound around body 6 and supported by ribs 13. Ribs 13 divide ideally the filtering surface 7 into sectors 16 essentially corresponding to openings 14. The filtering surface 7 is built with apertures having meshes between 3 and 50 microns. A central hole 18, coaxial with cartridge 4, is formed in lid 5 and is connected to the engine (not shown). Bottom wall 19 of shell 1a (with a coaxially placed outlet 3) contains one or more drainage holes 20.

Inside chamber 12 and coaxial to cartridge 4 a pumping device 12 is housed with an actuator 22, both of which are firmly mounted on trunion fixture 23. Trunion fixture 23 freely revolves around its own axis, because it is mounted on bushing 24 which is coaxial with outlet 3, which is formed as an integral part of wall 19. Surrounding outlet 3 and concentric to bushing 24 is a crown gear 25 with serrations 26.

Trunion fixture 23 is formed by three integral disks 27, 28 and 29 placed one above the other, wherein a fixed radial tongue 30 connects disks 27 and 29; unlike to Bizard's Filter, two fixed radial tongues 31 and 32 connect disks 28 and 29. The tongues 30 and 31 are placed in angular position one under the other. Tongue 32 is angularly staggered in regard to tongues 30 and 31 at a pre-established angle, which corresponds to the angular sector covered by one or more of the adjacent sectors 16 and calculated so as to define between tongues 30 and 31 a chamber 43, the volume of which has to be equal to about 10% of the total volume of oil, which passes in the time unit through device 1. Between tongues 31 and 32 there is a radial and mobile tongue 33 rigidly fixed to a central shaft 34, which is hollow and free to rotate coaxially on the trunion fixture 23, being housed in concentric holes 35 in disks 27, 28 and 29. A radial tongue 36 movable between disks 27 and 28 and integral with tongue 33 (which is mavable between disks 28 and 29) is angularly offset with respect to tongue 33 on hollow shaft 34. On disks 27 and 28 there is a cylindrically shaped sleeve 37, so that the space between disks 27 and 28 is subdivided into two closed essentially sealed chambers 38 and 39, which are divided by a fixed partition formed by tongue 30 and by a mobile partition formed by movable tongue 36. In chamber 39 there is a duct 40 communicating with hole 41 in disk 27 to allow flowing oil arriving from by-pass 9 to inter pumping device 21. Disks 27, 28 and 29 are housed in body 6 and rotate, thus subdividing chamber 12 into two separate portions, the upper portion being chambers 38 and 39, and the lower portion being chambers 42 and 43, which are limited externally by filtering surface 7 and partitioned by tongues 31 and 32.

Chamber 43 is internally subdivided into two areas 44 and 45, having a variable size because of the mobile partition formed by tongue 33. In chamber 42 there are holes 46 for drainage of the lubricating oil toward outlet 3. Disk 29 is further equipped with a ratchet gear 47 which engages serrations 26 so that trunion fixture 23 can rotate only in one direction. Further, shaft 34 is equipped with a ratchet gear 48 which also engages serrations 26, so that shaft 34 can only rotate in the same direction as trunion fixture 23.

Pumping device 21 is therefore formed by tongues 31, 32 and 33 which operate as a volumetric double-acting pump. Actuator 22, which includes chambers 38 and 39 and a dispensing mechanism 49, comprising a revolving occluding element 50 inside shaft 34. Grooves 51 and 52 in communication with the sump through hole 18 are axially bored in the surface of shaft 34 and communicate the sump with chambers 39 and 38, respectively. Grooves 53 and 54, which are axially bored in shaft 34 at the opposite end of grooves 51 and 52, fluidly communicate chamber 42 and 43 with chambers 39 and 38, respectively through holes 55 and 64 bored in shaft 34. At the level of chamber 39 there is a slot 56 in shaft 34 from which arm 57 protrudes and is integral with occluding element 50. A fixed pivot 58, integral with disk 28, through resilient particulation 59 comprising fork 60, which rotates about pivot 58 is equipped with a spring 61. Bracket 62 engaged with fork 60 is integral within 63 of arm 57.

Figure 4C:
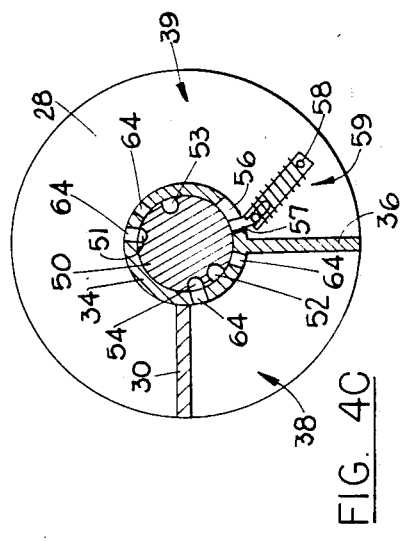
Figure 4D:
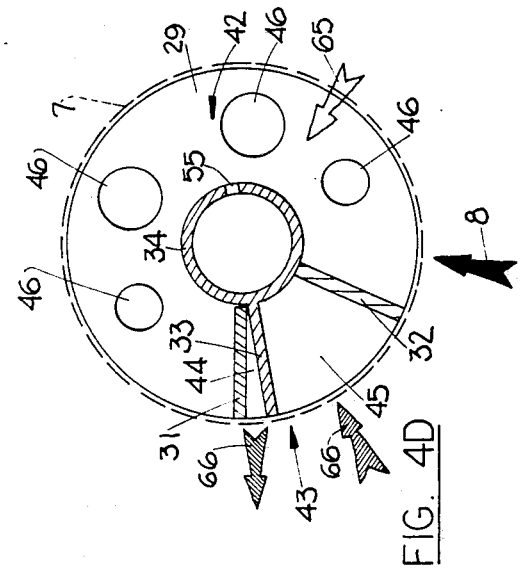

According to the process of the invention the operation of device 1 is that as follows. A continuous flow 8 of lubricating oil from the engine sump flows through inlet 2 and through openings 14 of filtering surface 7, thus obtaining said first step. Flow 8 crosses surface 7 and reaches chamber 12 and chambers 42 and 43, which communicate with the lower portion of chamber 12, while the upper portion of chamber 12 is sealed by sleeve 37. In this way lubricating oil 8 is divided into two portions 65 and 66. The first portion 65 flows into chamber 42 and from there travels through holes 46 to outlet 3 and finally back into the engine lubrication circuit. The second portion 66 is intercepted between one of the fixed tongues 31 and 32 and movable tongue 33 in conformity with the position of the latter. The second step of the invention procedure is so obtained, the rate of flow of portion 66 being determined by the number of sector 16 uncovered by the tongues. With reference to FIG. 4.b, which illustrates one of the possible positions of the apparatus 1 in operation, area 44 of chamber 43 shows its maximum possible dimension, because tongues 33 and 32 are in adjacent positions. In this case, second flow 66 is intercepted by area 44 via tongues 31 and 33. Through hole 55 a small part of the first portion 65 (which is under pressure because the connection with the oil circulation pump 72) reaches chamber 39 of the actuator 22 (FIG. 4.a). As a matter of fact, the oil under pressure goes upward inside hollow shaft 34 and along groove 53 of occluding element 50, which groove is aligned with hole 64. Groove 53 corresponds to one of the holes 64 and therefore the oil under pressure reaches chamber 39 without being able to flow outwardly therefrom because the remaining holes 64 bored within chambers 39 are closed by accluding element 50, because they are in an offset position in regard to groove 51. At the same time, chamber 38 is connected with the sump via central hole 18 and hole 64, which is aligned with groove 52 and thus under low pressure, while groove 54 is out of alignment with the remaining holes 64. Consequently, due to the pressure difference existing between chambers 38 (low pressure) and 39 (high pressure), tongue 36 rotates in the direction of the arrow in FIG. 4.a, entraining in its rotation shaft 34 and occluding element 50. Tongue 33, integrally formed with shaft 34 simultaneously rotates toward tongue 31 (FIG. 4.b) and is effecting a countercurrent flush of second portion 66 of the lubricating flow 8 from chamber 43 through decreasing area 44 and out through surface 7 of relevant sector 16. At the same time, tongue 32 and 33 moves so that the size of the area 45 increases and intercepts a new second portion 66 of flow 8. In this way said third step of the process is obtained by means of device 1 simultaneously to the second step. In fact, because flow 8 is continuous, both second and third steps must be continuous and synchronous according to the invention, in order to carry out their functions, and are in fact effected alternatively and synchronously by area 44 and 45 of chamber 43; these two steps are continuous and syncronous also in device 80 of FIG. 8, and this defines, therefore, a further characteristic of the process according to the invention, characteristic that cannot be found in the operation of the filter of U.S. Pat. No. 3,081,876 (Bizard); this latter, unlike device 1, is in fact not able to generate a continuons backflushing flow, owing to the different structure of both its pumping and actuating part with respect to the analogous part 21 and 23 of device 1.

At the end of the movement in the second step, tongue 36 is in the position illustrated in FIG. 4.c, while tongue 33 is near tongue 31, in a symmetrical position as shown in FIG. 4.d. The rotation of the occluding element 50 with respect to pivot 58 causes movement of articulation 59, which triggers the resilient reaction of spring 61 and causes the displacement of the occluding element 50 with respect to shaft 34 bearing in this manners the position of the grooves with respect to holes 64 as illustrated in FIG. 4.c. In this new position of the occluding element 50, chamber 38 is under pressure because it communicates with groove 54; while chamber 39 is in communication with the sump via central hole 18 and groove 51 as shown in FIG. 4.c, permitting the oil present in chamber 9 to flow out. The pressure difference acts again on tongue 36, but in a reverse direction. The latter, however, cannot return back because this movement is hampered by ratchet gear 48 engaging serrations 26. This causes the whole trunion fixture 23 to revolve around its axis while tongues 36 and 33, including occlusing element 50 and shaft 34 remain stationary. In this way, tongue 30 moves away from tongue 36, and tongue 31 moves away from tongue 33 while tongue 36 approaches pivot 58 as shown in FIG. 4.a and causes a new trigger action of articulation 59 thus changing the position of occlusion element 50. In this manner, the apparatus is once again positioned as shown in FIG. 4.a and 4.c, with the only difference being that the whole revolving trunion fixture 23 rotates so that area 44 now corresponds to a different sector 16. At this stage the described movements are repeated cyclicly, so that areas 44 and 45 find themselves successfully communicating with each of the sectors 16 until they accomplish an entire revolution. Because of the movement of the rotating trunion fixture 23, also the fourth and last step of the above described process of the invention is obtained by device 1.

The main advantages of the invention process consist in that it enables operators, by only replacing the ordinary strainer with an appropriate device, to prolong almost indefinitely the life of lubricating oils, only a small periodical filling up being sufficient for reinstating the correct percentage of additives, while the chemical aging of the oil pratically ceases, in a longer life of the engine with employ the oil treated with the method of the invention, and in the fact that the thixotropic properties conferred to the oil treated by the described process enable an easy and efficient starting of the engine, making easier the transition from a greasy (oily) lubrication to a dynamic one.

From the above description it appear obvious that variations and modifications of the process and apparatus are possible. In particular, the above described apparatus can also function if arranged upsteam from pump 72 as devices 80 or 74, provided that hole 18 is connected to the pump delivery instead of the sump.

What I claim is:

1. A process for treating a lubricating oil and occludent sludge particles in order to eliminate said sludge particles formed because of oil aging, the process being carried out continuously on flowing lubricating oil during operation of an internal combustion engine, comprising:

a first step, in which flowing oil from the engine is passed, under a first pressure, through a filtering surface having meshes of relatively small size;

a second step, in which said flowing oil is subdivided into a first and a second portion having pre-established rates of flow, said first portion having a rate of flow not lower than 10% of the rate of flowing oil from the engine;

a third step, in which said first portion is backflushed through a section of said filtering surface, in counterflow to the direction of flow in said first step and at a pre-established second pressure, said second pressure being at least 2 $Kg/cm^2$ higher than said first pressure of said flowing oil from the engine, the second of said two portions being passed back into said internal combustion engine; and a fourth step, in which a plurality of adjacent sections forming said filtering surface are successively back flushed by said first portion; said second and third steps being performed continuously and simultaneously, and the mesh size of the filtering surface being chosen in view of said back flushing pressure and rate of flow of said first portion in such a manner that, during said first and third steps, said sludge particles are subjected to a shear rate capable of impeding the formation of deposits on the filtering surface and breaking and mixing continuously said sludge particles.

2. A process according to claim 1, wherein the dimension of the meshes of said filtering surface are between 3 and 50 microns.

3. A process according to claim 1, wherein said first and third steps homogenize said sludge particles to confer thixotropic properties to the lubricating oil.

4. A process according to claim 1, wherein said sludge particles comprise about 16% by weight of the lubrication oil.

5. An apparatus for the regeneration of lubricating oil during operation of an internal combustion engine comprising: a hollow body having an inlet for receiving lubricating oil from the engine and an outlet for returning lubricating oil to the engine; a filtering surface with meshes of relatively small size arranged between said inlet and said outlet; interception and pumping means arranged between said filtering surface and said outlet for dividing the flowing oil into two portions and for pressuring one of said portions and delivering the pressurized portion of said flow through a sector of said filtering surface in counterflow to said flowing oil; and actuating means mechanically connected to said interception and pumping means for actuating the same and for displacing the interception and pumping means in such a manner that a plurality of adjacent sectors forming said filtering surface are successively exposed to the pressurized counterflowing oil; said interception and pumping means including a pair of spaced apart disks rotatably mounted on a hollow shaft, said disks and said hollow shaft being rotatably mounted inside said hollow body, a pair of angularly spaced apart tongues fixedly secured to said pair of disks for rotation therebetween, and a third tongue arranged between said pair of tongues and fixedly secured to said hollow shaft for rotation with said shaft.

* * * * *